(No Model.)

F. TAYLOR.
BELT SHIFTER.

No. 579,100.  Patented Mar. 16, 1897.

Witnesses:—
Frank S. Ober.
A. M. Hayes

Inventor:—
Frank Taylor,
by Fowler & Fowler,
Attys.

THE NORRIS PETERS CO., PHOTO-LITHO., WASHINGTON, D. C.

UNITED STATES PATENT OFFICE.

FRANK TAYLOR, OF PLYMOUTH, ENGLAND.

BELT-SHIFTER.

SPECIFICATION forming part of Letters Patent No. 579,100, dated March 16, 1897.

Application filed June 25, 1894. Serial No. 515,619. (No model.) Patented in England November 16, 1893, No. 21,942.

*To all whom it may concern:*

Be it known that I, FRANK TAYLOR, a subject of the Queen of Great Britain, and a resident of Plymouth, in the county of Devon, England, have invented certain new and useful Improvements in Belt-Shifters, of which the following is a specification, and which has been patented to me in Great Britain, No. 21,942, dated November 16, 1893.

My invention relates to improvements in belt-shifters by means of which certain advantages are obtained.

Figure 3:
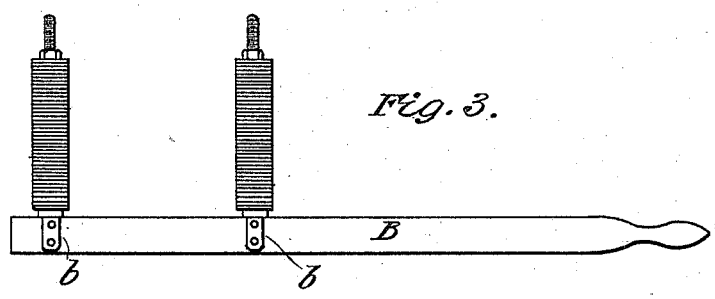
Figure 2:
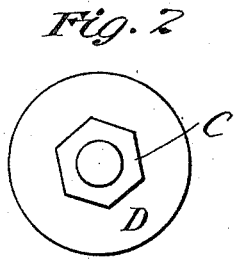
Figure 1:
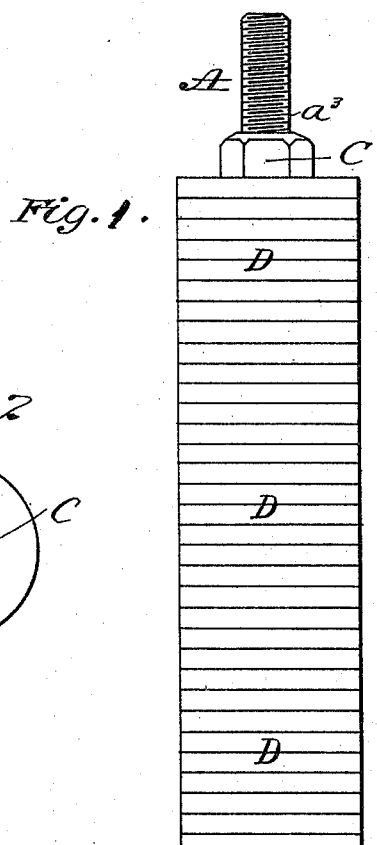
Figure 4:
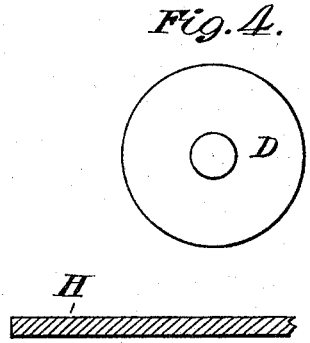

In the accompanying sheet of drawings, Figure 1 is an elevation of a prong of a belt-shifter as constructed under my invention and shown as detached. Fig. 2 is a plan of the same. Fig. 3 is a belt-shifter of the usual type fitted with two prongs constructed under my invention. Fig. 4 shows one of the disks hereinafter mentioned.

Referring to Fig. 1, A is a long cylindrical spindle of wrought-iron or other suitable material. One end $a'$ of this spindle is adapted for attachment to the draw-bar B of the belt-shifter in any convenient manner. In the case illustrated it is shown attached by means of bolts and nuts $b\ b$, passing through the holes $a^2\ a^2$. The other or upper end $a^3$ of the spindle has a screw-thread cut on it.

C is a nut adapted to screw on the upper or threaded end of the spindle.

D D D are perforated disks of leather, vulcanized fiber, or other like material, one of which is shown separately in Fig. 4. These disks are strung upon the said spindle, as will be seen in Fig. 1, where there are thirty-three shown in position.

To build up one of my prongs, the necessary number of perforated disks is strung upon the spindle, and then the nut C is screwed down over the threaded end of the spindle upon the disks, so as to clamp them together more or less tightly. If the cylinder now formed by the superposed disks is not sufficiently smooth and regular in shape, I may place it upon a lathe and turn it true.

It is preferable not to clamp the disks down too tightly, but to leave them sufficiently loose to allow of their rotating round the spindle when pressed upon by a moving belt.

When in use, the edges of the belts H come in contact with the edges of the disks, which are substantially of the same thickness as the belts, and may either slip over them or cause the said disks to rotate round the spindle. The result is that there is far less wear and tear upon the edges of the belts, and this advantage is particularly noticeable in the case of leather link belts and cotton and hair belting.

When in practice the edges of any of the disks get worn, the nuts can be unscrewed, the disks taken off the spindle, and then replaced upon the spindle in different order, so that the worn disks may now occupy a position in which they come less in contact with the moving belt.

What I claim as my invention, and desire to secure by Letters Patent, is—

1. In a belt-shifter, the combination of a spindle having a screwed end, a series of perforated rotary disks and a nut, the said disks being strung upon the said spindle and loosely clamped together thereon by means of the said nut and adapted to be rotated independently of each other.

2. In a belt-shifter, the combination of a spindle, and a series of perforated disks strung upon said spindle and turning thereon, each of the said disks being substantially of the same thickness as the belt and having their peripheries engaged by the edge of the belt, substantially as and for the purpose described.

3. A belt-shifter consisting of a draw-bar B provided with a pair of prongs or spindles, and a series of perforated disks D of substantially uniform diameters strung upon each of said spindles and turning thereon, each of the said disks being substantially the same thickness as the belt and adapted to have their peripheries engaged by the edges of the belt, substantially as and for the purpose set forth.

FRANK TAYLOR.

Witnesses:
WM. ADAMS,
JOHN S. NORTHOVER.